No. 659,864. Patented Oct. 16, 1900.
W. R. WHITE.
COTTON CHOPPER.
(Application filed Aug. 27, 1900.)
(No Model.) 2 Sheets—Sheet 2.
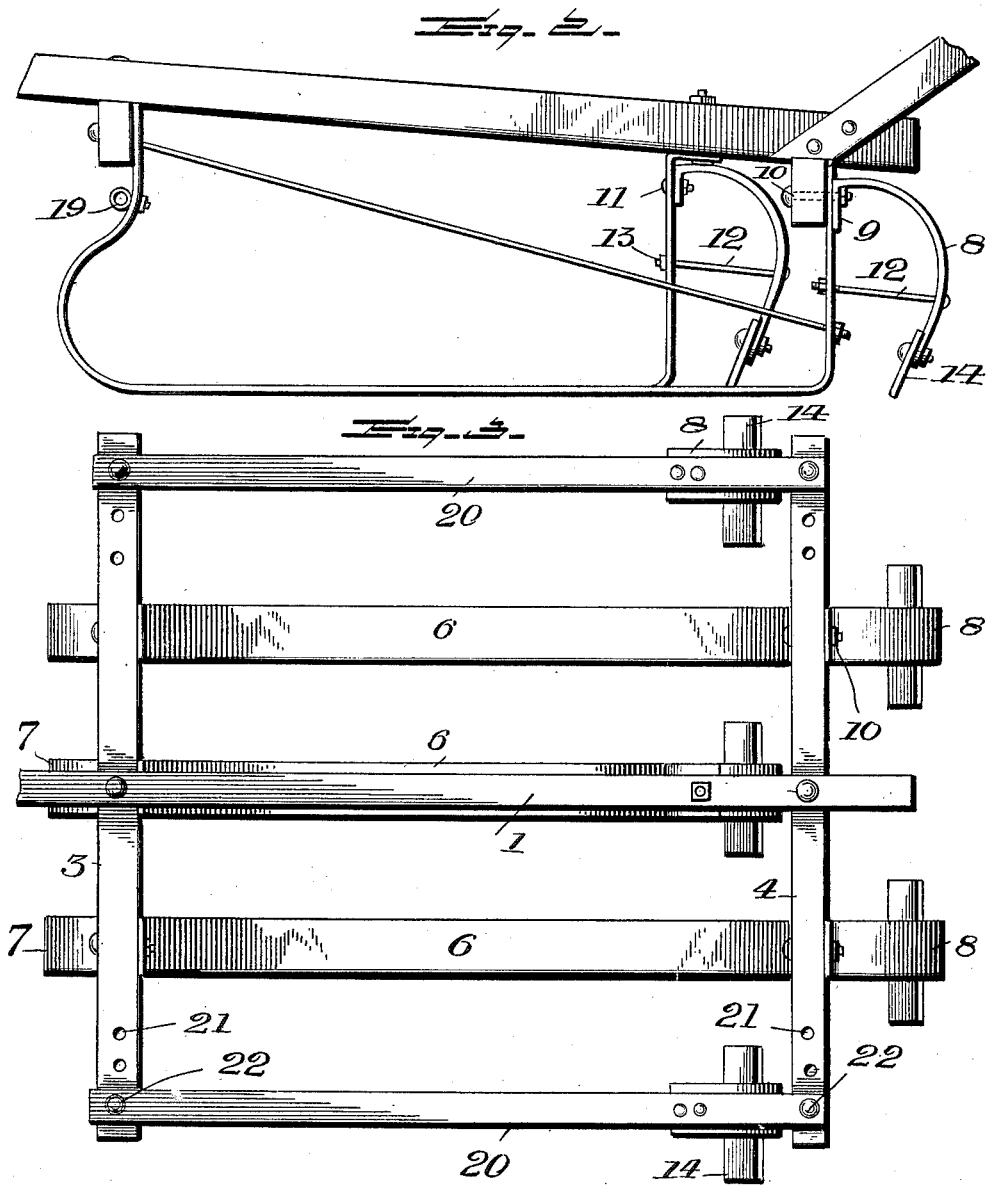
WITNESSES:
L. C. Hills.
Chester A. Baker.
INVENTOR
William R. White,
BY 
Attorney

UNITED STATES PATENT OFFICE.

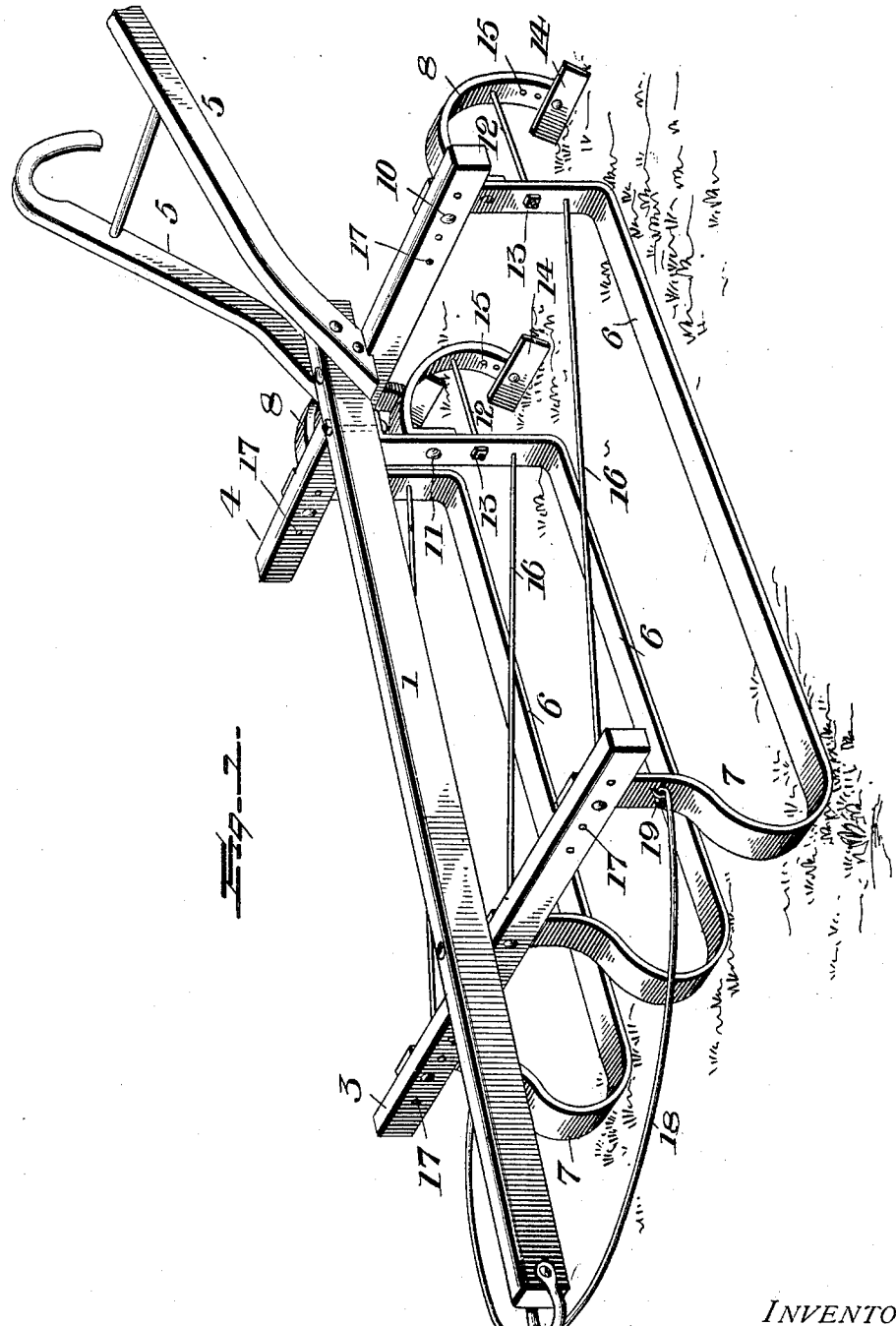

WILLIAM R. WHITE, OF TROY, ALABAMA.

COTTON-CHOPPER.

SPECIFICATION forming part of Letters Patent No. 659,864, dated October 16, 1900.

Application filed August 27, 1900. Serial No. 28,213. (No model.)

*To all whom it may concern:*

Be it known that I, WILLIAM R. WHITE, a citizen of the United States, residing at Troy, in the county of Pike and State of Alabama, have invented certain new and useful Improvements in Cotton-Choppers; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to cotton-choppers; and it has for its object to provide a cotton-chopper which will be simple in construction and efficient in action and which will comprise a series of runners adapted to extend from one row to another and to rest thereon, so that the implement will glide smoothly and easily in operation, the runners being made of light metal having a swan's-breast-shaped front end, so as to impart more resiliency to the forward part of the runners and at the same time prevent the runners from striking abruptly against the sides of the rows. The implement also comprises standards curving downwardly from the rear of the runners and having attached thereto vertically-adjustable blades or hoes, whereby the depth of cut may be regulated, said standards being braced by means of brace-rods to the rear of the runners and the runners being also braced by brace-rods extending from the rear to their front ends, said brace-rods preventing the runners from springing out of shape in use. The runners are also made adjustable to and from each other, so that the hoes or blades may cut closer together or farther apart, as the conditions of the plants may require. There is also provided at the front a swinging bail-shaped equalizer, whereby the strain or pull is distributed from one side to the other of the implement if for the moment there happens to be a greater draft on one side than the other occasioned from any cause.

To the accomplishment of the foregoing and such other objects as may hereinafter appear the invention consists in the construction and also in the combination of parts hereinafter particularly described and then sought to be specifically defined by the claims, reference being had to the accompanying drawings, forming a part hereof, and in which—

Figure 1 is a perspective of a cotton-chopper embodying my invention. Fig. 2 is a side view of the same with parts broken away and other parts omitted, and Fig. 3 is a plan view showing one of the choppers with five instead of three runners and correspondingly-increased number of hoes or blades.

In the drawings the numeral 1 designates a longitudinal beam, to which are bolted the front and rear cross-bars 3 and 4, and 5 designates the handles.

The numeral 6 designates a number of runners extending from the front to the rear cross-bars, the length of the runners being such that they will extend from one row of plants to another row, so as to rest upon the rows, and thus cause the implement to glide smoothly across the rows in operation instead of dropping down between the rows, and thus causing an unevenness of movement and a greater strain upon the horse, as would be the case if the runners were made short, so as to drop down between the rows. These runners are made of comparatively-light metal and at the forward ends extend upwardly and are bent into swan's-breast form, as seen at 7, the upper ends being bolted to the front cross-beam 3, the curved portion of the swan's breast lying in front of said cross-beam, thus imparting to some extent some resiliency to the runners at their front ends and also assisting in moving over the rows without striking abruptly against the same. The rear ends of the runners are bent upwardly and bolted to the rear cross-beam 4, except the middle runner, which is made shorter than the others and which at its rear end is bolted to the longitudinal beam 1 instead of to the cross-beam 4, as illustrated in Figs. 1 and 2 of the drawings. The front ends of the runners extend higher than the rear ends, so that the front of the chopper will stand six inches, more or less, higher than the rear end, so as to give sufficient rise over the beds or rows to prevent abrupt striking against the row or bed.

To the rear of each runner is attached a standard 8, which is preferably made of the curved form shown and at its upper end has a flange 9, through which passes the bolt 10, which secures the rear end of the runners to the rear cross-bar, which bolt is also thus made to attach the standards to the rear ends of the runners, although the standards may be secured to the rear ends of the runners by an independent bolt, as indicated in the case of the middle runner, where the standard is secured to the upper end of that runner by a bolt 11. Each of the runners is braced between its upper and lower ends by means of a brace-rod 12, which extends from the standard to and through the upwardly-extending rear portion of the runners, to which it is held by means of a nut 13 on the threaded end of the brace-rod, as illustrated in Figs. 1 and 2 of the drawings. Each standard carries at its lower end a blade or hoe 14, which is adjustable up and down on the standard by means of its securing-bolt and the holes 15, formed in the standards, as illustrated in Fig. 1 of the drawings.

The runners 6 are braced each by a brace-rod 16, which connects the front and rear upwardly-extending ends of each runner, each rod extending from the upper part of the front end to the lower part of the rear end, as illustrated in Figs. 1 and 2 of the drawings, thereby preventing the runners from springing out of shape in operation.

The outside runners can be adjusted inwardly or outwardly by bolting the same in any one of the holes 17, formed in the front and rear cross-bars, thus enabling the hoes to cut closer together or farther apart, as the condition of the plants may require. The purpose of having the middle runner terminate in front of the side runners is to avoid the liability of choking and of covering up the cotton, to do which there is a liability if the hoes all terminate or operate in line with each other; but by having the middle runner terminate in advance of the outside runners the hoes are brought in such relation with one another that there is ample space between the hoes for the dirt to pass, so that there will be no such accumulation as would tend to choke or to cover up the plants.

If one of the side runners happens to strike against a row or bed that is a little higher at that point than where the other side runner meets the same row, there will be a tendency to throw the chopper a little to one side, and to overcome this I provide an evener or equalizer, which I make in the form of a bail 18, whose opposite ends are hooked into eyes 19, bolted or otherwise attached to the two outside runners, this bail extending to the front end of the beam 1 and lying near to the clevis 19, so that the ring or hook of the singletree may pass around the bail when it is made to enter the clevis 19, and in this way the strain or pull is distributed or equalized and the implement made to run easier. This affords a very simple and efficient equalizer.

In Fig. 1 of the drawings I have illustrated only three runners; but there may be a greater number—as, for instance, in Fig. 3 of the drawings I have illustrated five runners and two additional hoes. This is effected by having the front and rear cross-bars 3 and 4 made a little longer and having them connected together at their outer ends by longitudinally-extending bars 20, to each of which bars will be connected a standard 8, carrying a hoe 14, secured thereto. These longitudinal side bars 20 are adjustable inwardly and outwardly by reason of being secured in any one of the holes 21 by means of the bolts 22. These outside standards may be braced by brace-rods similar to the brace-rods of the other standards, said brace-rods connecting with the side bars 20. It will thus be seen that the number of hoes can be increased in the manner indicated, and, if desired, all of the runners and hoes except the one connected beneath the beam 1 may be omitted, and thus it will be observed that the number can be increased or decreased as desired.

I have illustrated and described what I consider to be the preferred details of construction and arrangement of the several parts; but it is obvious that changes can be made in the details of some of the parts without departing from the spirit of my invention.

Having described my invention and set forth its merits, what I claim is—

1. A cotton-chopper, comprising a beam, a runner having an upwardly-extending rear portion and a swan's-breast upwardly-extending front portion, a brace-rod connecting the front and rear upwardly-extending portions, a standard at the rear of the runner, and a brace-rod connecting said standard and the upwardly-extending rear portion of the runner, substantially as described.

2. A cotton-chopper, comprising a beam and cross-bars, a number of runners secured to the cross-bars, each of said runners consisting of a strip of metal having upwardly-extending rear portions and upwardly-extending swan's-breast front portions, said runners being each in one continuous piece from front to rear and adapted to extend from one row or bed to another and rest thereon, said runners being of different lengths, and standards at the rear of said runners and carrying blades or hoes, said standards being out of line with each other, substantially as and for the purposes described.

3. A cotton-chopper, comprising a longitudinal beam and cross-beams, runners extending lengthwise of the longitudinal beam and each formed of a strip of metal having an upwardly-extending rear portion and a swan's-breast upwardly-extending front portion, one of said runners terminating at its rear in advance of the other runners, curved standards at the rear of the runners and provided each with a hoe or blade, brace-rods connecting said standards with the upwardly-extending rear portions of the runners, and brace-rods connecting the front and the rear of each runner, substantially as and for the purposes described.

4. A cotton-chopper, comprising a longitudinal beam and cross-beams, a number of runners extending lengthwise of the longitudinal beam and each formed with an upwardly-extending rear portion and a swan's-breast upwardly-extending front portion, one of the runners terminating at its rear in advance of the other runners, brace-rods connecting the front and rear portions of the runners, standards at the rear of the runners and provided each with a hoe or blade, a brace-rod connecting the rear of each runner with one of the standards, and an equalizer in the form of a bail having its ends connected to the outer runners and its front portion lying next to the clevis, substantially as and for the purposes described.

In testimony whereof I affix my signature in presence of two witnesses.

WILLIAM R. WHITE.

Witnesses:
JEP. NICHOLS,
J. D. GAFFORD.